United States Patent [19]
Lundberg et al.

[11] Patent Number: 4,529,527
[45] Date of Patent: Jul. 16, 1985

[54] METHOD FOR CONTROLLING VISCOSITY OF LUBRICATING OILS

[75] Inventors: Robert D. Lundberg, Bridgewater; Robert R. Phillips, Spring Lake Hgts., both of N.J.; James E. McGrath, Blacksburg, Va.

[73] Assignee: Exxon Research and Engineering Co., Florham Park, N.J.

[21] Appl. No.: 610,128

[22] Filed: May 14, 1984

[51] Int. Cl.[3] .......................... C10M 1/40; C10M 3/34

[52] U.S. Cl. .................................... 252/33; 252/47.5; 252/48.4

[58] Field of Search ........................................ 252/33

[56] References Cited

U.S. PATENT DOCUMENTS

| | | | |
|---|---|---|---|
| 3,396,136 | 8/1968 | Dickerson | 252/33 |
| 3,856,685 | 12/1974 | Mori | 252/56 R |
| 3,931,021 | 1/1976 | Lundberg | 252/33 |

*Primary Examiner*—John F. Niebling
*Attorney, Agent, or Firm*—Richard E. Nanfeldt

[57] ABSTRACT

The instant invention relates to an improved process for controlling the viscosity of organic liquids at low temperatures by incorporating in said liquid a minor amount of an ionic polymer and a cosolvent for the ionic groups of said polymer. The ionic polymer comprises a backbone which is substantially soluble in said organic liquid and pendant ionic groups which are substantially insoluble in said organic liquid, wherein such ionic polymer or terpolymer is formed from at least one acrylate or methacrylate monomer having at least eight carbon atoms and a minor portion of a sulfonate-containing monomer. A cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated co- or terpolymer containing from 0.2 up to 10.0 mole percent ionic groups which has been neutralized by a basic material selected from Group IA, IIA, IB and IIB of the Periodic Table of the Elements (also lead, tin and antimony) and a nonvolatile alcohol or amine cosolvent. In a most preferred embodiment, the solvent is a high boiling paraffinic-type oil, the polymer is a metal sulfonate containing acrylate or methacrylate copolymer, comprising from 0.3 to 3.0 weight percent sodium or potassium sulfonate groups, and a $C_6$ to $C_{12}$ alcohol, or $C_2$–$C_{12}$ glycol, or $C_3$–$C_{12}$ triol is used as the cosolvent.

20 Claims, No Drawings

METHOD FOR CONTROLLING VISCOSITY OF LUBRICATING OILS

FIELD OF INVENTION

The instant invention relates to an improved process for controlling the viscosity of organic liquids at low temperatures by incorporating in said liquid a minor amount of an ionic polymer and optionally a cosolvent for the ionic groups of said polymer. The ionic polymer comprises a backbone which is substantially soluble in said organic liquid and pendant ionic groups which are substantially insoluble in said organic liquid, wherein such ionic polymer or terpolymer is formed from at least one acrylate or methacrylate monomer having at least eight carbon atoms and a minor portion of a sulfonate-containing monomer. The optional cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated co- or terpolymer containing from 0.2 up to 10.0 mole percent ionic groups which has been neutralized by a basic material selected from Groups IA, IIA, IB and IIB of the Periodic Table of the Elements (also lead, tin and antimony) and a nonvolatile alcohol or amine cosolvent. In a most preferred embodiment, the solvent is a high boiling paraffinic-type oil, the polymer is a metal sulfonate containing acrylate or methacrylate copolymer, comprising from 0.3 to 3.0 weight percent sodium or potassium sulfonate groups, and a $C_6$ to $C_{12}$ alcohol, or $C_2$–$C_{12}$ glycol, or $C_3$–$C_{12}$ triol is used as the cosolvent.

BACKGROUND OF THE INVENTION

The rapid decrease in viscosity of liquids with increasing temperature is well-known. Ideally, for many applications (automobile lubricants, etc.) it would be desirable to solve this problem so that liquid viscosity would be insensitive to temperature. Alternatively, it might be desirable to provide liquid systems whose viscosities actually increase with temperature. It is true that with selected polymeric additives, it has been possible to reduce substantially the viscosity change with temperature which does occur with most oils and similar systems. These polymer additives, known as viscosity index improvers (or V.I. Improvers), are generally high molecular weight polymers.

The way in which these additives function can be summarized very briefly. In effect, they perform two functions, i.e., thickening, which merely increases fluid viscosity; and Viscosity Index (V.I.) improvement, which corresponds to limited thickening at ambient temperatures and a corresponding greater thickening at elevated temperatures. This can be accomplished by utilizing a polymeric additive which is poorly solvated by the liquid at ambient temperatures; however, at elevated temperatures, the polymer is more highly solvated such that the polymer expands and is a relatively more effective thickener.

While these V.I. Improvers have proven successful commercially, it is important to note that their effect at reducing viscosity changes with temperatures is rather mild. For a typical base oil containing a suitable V.I. Improver, the kinematic viscosity will still decrease by a factor of from 5 to 10 as the temperature increases from 30° to 100° C. Obviously, if it is desired to hold the viscosity roughly constant with such temperature changes, current technology has not offered an appropriate additive system.

U.S. Pat. No. 3,396,136 describes how copolymers of alkenylaromatic sulfonic acids, when properly neutralized, can be employed as thickeners for nonpolar solvents. Those metal sulfonate systems have been shown to be very effective; however, when employed as 2 component systems (i.e., ionic polymer plus nonpolar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent, i.e., a solvent for the sulfonate groups about equal in amount to the amount of sulfonate groups which are present. This amount of polar cosolvent is not within the critical limits of the instant invention, which require amounts of the third component (which interacts with the ionomeric groups of the ionomer copolymer) at levels which range from 10 to 600 times the molar equivalence of ionic groups. This level of cosolvent is about one to two orders of magnitude or more higher than employed in the cited art. This amount of such cosolvent is required to obtain the unusual and unexpected viscosity-temperature behavior which is observed. In addition, the cited patent is restricted to aromatic sulfonate polymers. The instant invention describes other polymers such as co- or terpolymers of acrylates or methacrylates with a sulfonate-containing monomer.

U.S. Pat. No. 3,666,430 teaches the gelling of organic liquids by the interaction of polar "associative bonds" which includes hydrogen bonding and "ionic crosslinking." Again this patent specifies that two components are necessary—the associating polymer (or polymers in some cases) and the nonpolar organic liquid. There is no mention of a third polar cosolvent except to point out that such polar liquids should not be present. Specifically, this patent states (column 2, line 7) that the hydrocarbon liquids to which this invention is to be applied should not contain a substantial portion of a miscible protolytic liquid such as methanol. It is clear that the language of this patent limits this invention to gels and further, that any amount of polar liquids which are present to an extent where they disrupt those gels are undesirable. The instant invention is distinct from that cited in that amounts of such polar compounds, as will break up gel at ambient conditions are required, and in fact, the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (column 3, line 72) that it is critical in the preparation of such polymers that no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions and is directed towards amine or ammonium derivatives. Only metallic counterions are effective in the instant invention and, in fact, attempts to employ amine derivatives have not resulted in the products which are the objective of this invention. Finally, this cited patent does describe (column 7, lines 13–19) that the addition of alcohols will reduce the viscosity of the thickened hydrocarbon and alter flow characteristics thereof.

One class of oil soluble polymers known to possess good low temperature viscometrics and to be practically of great interest in the V.I. additive area is that of the acrylate or methacrylate polymers. These long chain acrylate systems (alkyl groups of about 10 to 12 carbons or so) are sold commercially and have been very successful in achieving a suitable balance of thickening behavior and a combination of good low temperature fluidity and high temperature viscosity at reasonable polymer levels. This invention proposes a class of materials that will have comparable or superior viscometrics as compared to the acrylate or methacrylate family of materials. This preferred class of polymers is based on combining sulfonate containing monomers with acrylates and methacrylates of suitable chain length by appropriate polymerization techniques.

The instant invention represents an improvement over the process as described in U.S. Pat. No. 3,931,021, wherein the class of co- or terpolymers, as described in the instant invention, show improved low temperature viscometric properties. The co- and terpolymers of the instant invention are restricted to a class of polymers comprising copolymers and terpolymers derived from a metal sulfonate monomer and an alkyl acrylate or alkyl methacrylate, wherein the alkyl group has at least eight carbon atoms.

SUMMARY OF THE INVENTION

It is now discovered that improvements in the low temperature viscosity of organic liquids may be obtained by incorporating in said organic liquid, a minor amount of a critically selected ionomeric polymer and optionally, a polar cosolvent. The ionomeric polymer is characterized as having a backbone which is substantially soluble in said organic liquid, and pendant ionic groups which are substantially insoluble in said organic liquid, wherein the critically selected polymers are co- and terpolymers formed from a metal sulfonate styrene monomer and an alkyl acrylate or aklyl methacrylate monomer, wherein it is mandatory that the alkyl group has at least eight carbon atoms.

The number of ionic groups contained in the ionic polymer is a critical parameter affecting this invention. The number of ionic groups present in the polymer can be described in a variety of ways such as weight percent, mole percent, number per polymer chain, etc. For most polymer systems of interest in this invention, it is desirable to employ mole percent.

In general, the ionomeric polymer will comprise from 0.1 to 25 mole percent pendant ionomeric groups, more preferably from 0.2 to 10 mole percent pendant ionomeric groups. The ionic groups are sulfonate groups. The ionomers utilized in the instant invention are neutralized with the basic materials selected from Groups IA, IIA, IB, and IIB of the Periodic Table of the Elements (also lead, tin, and antimony). Ionic polymers which are subject to the process of the instant invention are co- and terpolymers derived from at least one alkyl acrylate and/or alkyl methacrylate monomer, wherein the alkyl group has at least eight carbon atoms and a minor amount of a metal sulfonate styrene monomer.

The solid co- or terpolymer of the instant invention comprises at least 80 percent by weight of at least one acrylate or methacrylate monomer having from 8 to 18 carbon atoms and a minor proportion of a metal or amine neutralized sulfonate monomer characterized by the formula:

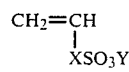

where X is $(CH_2)_n$, or aromatic wherein n=0, 1, 2, 3, 4, and Y is a cation selected from Groups IA, IIA, IB and IIB of the Periodic Table or an amine of the formula:

$$N{-}R_1,\ N{-}R_2,\ N{-}R_3$$

where $R_1$, $R_2$, and $R_3$ can be aliphatic groups of $C_1$ to $C_{12}$ or hydrogen, the co- or terpolymer being water insoluble.

The sulfonate-containing co- or terpolymers are preferably formed by a free radical copolymerization process. The monomers used in the free radical emulsion copolymerization processes are acrylates or methacrylates which are copolymerized with sulfonate-containing monomers.

In general, the acrylate or methacrylate and sulfonate-containing monomers are dispersed in a water phase in the presence of an initiator, a water soluble reducing agent and a suitable surfactant, wherein the temperature is sufficient to initiate polymerization. The resultant latex is coagulated, usually by the addition of an aqueous salt solution, and the recovered co- or terpolymer is washed with water and subsequently dried under vacuum at room temperature.

The co- or terpolymers formed from the free radical emulsion copolymerization process of the instant invention can be generally described as having a $\overline{M}_n$ of about 5,000 to about 2,000,000, more preferably about 10,000 to about 500,000. The co- or terpolymers of the instant invention contain about 0.1 to about 25 mole percent of chemically combined ionic comonomer, more preferably about 0.2 to about 10, and most preferably about 0.3 to about 7 mole percent ionic comonomer. The co- or terpolymers of the instant invention are water insoluble, substantially gel-free, thermally stable and oxidatively stable. A typical example of the copolymers which can be formed by the instant free radical emulsion copolymerization is: 2-ethyl-hexylmethacrylate/potassium styrene sulfonate copolymer. Obviously, a large number of copolymers and even terpolymers can be formed by the instant free radical copolymerization process. Typically, the copolymerization of any alkyl acrylate or alkyl methacrylate wherein the alkyl group has at least eight carbon atoms can be readily copolymerized with any sulfonate-containing monomer as is defined herein.

Acrylates or Methacrylates

The acrylates of the instant invention are generally defined as acrylate or methacrylate monomers having about 8 to about 18 carbon atoms. Typical, but nonlimiting examples of acrylates and methacrylates useful in the instant invention are: 2-ethyl-hexylacrylate, 2-ethylhexylmethacrylate and isodecylacrylate. The preferred monomers are: 2-ethylhexylmethacrylate and 2-ethylhexylacrylate, lauryl methacrylate and similar long chain methacrylates and especially mixtures thereof. In the formation of the sulfonate-containing copolymer, one copolymerizes one of the aforementioned acrylates or methacrylates with the sulfonate-containing monomer.

Sulfonate-Containing Monomers

The sulfonate-containing monomers of the instant invention which are water soluble can be generally described as a monomer having unsaturation and a metal or amine sulfonate group. The metal or amine neutralized sulfonate monomer is characterized by the formula:

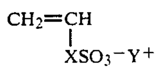

where X is $(CH_2)_n$, or aromatic wherein n=0, 1, 2, 3, 4, and Y is a cation selected from Groups IA, IIA, IB and IIB of the Periodic Table or an amine of the formula:

$$N \begin{matrix} R_1 \\ R_2 \\ R_3 \end{matrix}$$

where $R_1$, $R_2$, and $R_3$ can be aliphatic groups of $C_1$ to $C_{12}$ or hydrogen. Particularly suitable metal cations are sodium, potassium and zinc, and an especially preferred metal cation is sodium. Typical but nonlimiting examples of suitable sulfonate-containing monomers are:

(1) $CH_2{=}CHSO_3$ Na+sodium vinyl sulfonate (2) $CH_2{=}CHCH_2SO_3$ Na+sodium alkyl sulfonate (3)

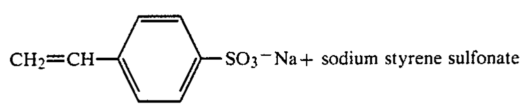

An especially preferred sulfonate-containing monomer is metal sulfonated styrene.

A redox emulsion polymerization recipe used in this invention is effective in initiating the copolymerization of water insoluble and water soluble comonomers in an emulsion system. The surface of the micelle/growing polymer particle is believed to be the locus of formation of initiator molecules as well as the polymerization locus. Water phase homopolymerization of the polar, water soluble monomer is effectively depressed because of low primary radical concentration in the aqueous phase.

Similarly, the activity of the free radical catalyst in the hydrocarbon monomer phase is substantially less than in the vicinity of the reducing agent. As a result, the polymerization of homopolymers is believed to be effectively depressed.

Reducing agents suitable for this invention are those known in the art with the additional requirement that they be soluble in water. A preferred reducing agent is triethylenetetramine.

A variety of free radical catalysts can be employed in this invention. This includes a preferential class of free radical initiators such as benzoyl peroxide, cumene peroxide, diisopropylbenzene hydroperoxide, t-butyl hydroperoxide, and similar systems which will be preferentially soluble in the monomer phase as opposed to the aqueous phase. There are a large number of such peroxides used in the art, and those having the appropriate solubility behavior and suitable decomposition temperatures in the presence of the reducing agents are satisfactory for the purposes of this invention. Also, a large number of water soluble initiators can be employed in this invention. A variety of such systems are known and are employed as redox initiators. A preferred catalyst system is potassium persulfate and sodium bisulfite. Others can also be employed.

The nonionic surfactants employed for this invention are varied and well-known in the art. The typical emulsifiers or surfactants can be employed; however, some are more effective than others in generating latices of better stability. A preferred emulsifier is Atlox 8916TF. The choice of the emulsifier is not critical.

The buffering agents employed in the instant polymerization process are selected from the group consisting of sodium carbonate, ammonia, sodium acetate, trisodium phosphate, etc. These buffering agents are typically employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate-containing monomer and the acrylate or methacrylate monomer.

The free radical emulsion copolymerization of the water soluble sulfonate containing polymer and the acrylate or methacrylate monomer yields a stable latex, wherein the resultant water insoluble copolymer is not covalently cross-linked and possesses substantial ionic cross-linking, and has about 0.1 to about 3 weight percent of chemically combined sulfur, more preferably about 0.2 to about 3. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble copolymer is recovered by filtration and subsequently washed with water and dried under vacuum conditions. Alternatively, the polymer can be coagulated by precipitation with alcohol such as methanol. Alternatively, the latex can be used to form ionically cross-linked films by evaporation to dryness.

The ionomeric co- or terpolymers may be incorporated into the organic liquid at a level of from 0.1 to 25 weight percent preferably 0.2 to 10 weight percent, more preferably from 0.5 to 5 weight percent, based on said organic liquid. The organic liquids which may be utilized in the instant invention are selected with relation to the ionic polymer and vice-versa. For example, the following preferred ionic polymers may be utilized to control the viscosity of the following organic liquids.

In general, the organic liquid should possess a solubility parameter ranging from 6.0 to 10.5. Generally, the ionic polymer will be derived from a polymer backbone having a solubility parameter within this range also.

Of particular interest in this invention, as organic liquids to be thickened, are lubricating oils.

The lubricating oil can be any fluid of low dielectric constant which does not chemically react with the ionic polymer or polar cosolvent. Fluids of lubricating viscosity generally have viscosities of from 35 to 50,000 SUS at 100° F. ($V_{100}$).

The fluid medium or oil may be derived from either natural or synthetic sources. Included among the hydrocarbonaceous oils are paraffin bases, naphthenic base and mixed base oils. Synthetic oils include polymer of various olefins, generally of from 2 to 6 carbon atoms, alkylated aromatic hydrocarbons, etc. Nonhydrocarbon oils include polyalkylene oxide, e.g., polyethylene oxide, silicones, etc. The preferred media are the hydrocarbonaceous media, both material and synthetic, particularly those intended for use as a crankcase lubricant. The lubricating fluid should meet the viscosity standards of the Society of Automotive Engineers Recommended Practice, SAEV 300a.

In lubricating fluids, it is often the practice to add additional components to perform certain functions, i.e. to increase oxidative stability, antioxidants are added. There are many such components. Such materials normally will not interfere with the purposes of the instant invention and the normal level at which they are employed, they can often be regarded as inert. However, there may be such additives which are within the constrants (i.e. solubility parameter) of the polar solvent. Indeed such components can replace part of the polar cosolvent provided that they are within the aforementioned constraints.

One method of the instant invention includes incorporating a cosolvent for example, a polar cosolvent into the mixture of organic liquid and ionomer to solubilize the pendant ionomeric groups. The polar cosolvent will have a solubility parameter of at least 10.0, more preferably at least 11.0, and may comprise from 0.1 to 40, preferably 0.5 to 20 weight percent of the total mixture of organic liquid, ionomeric polymer and polar cosolvent.

In addition to the requirements for ionic polymer, organic liquid and polar cosolvent, there is the additional and important constraint that the polar cosolvent be more polar than the organic liquid. This is required in order that the proper interaction between polar cosolvent and ionic groups obtain. If we designate the solubility parameter of the organic liquid as Sp and the solubility parameter of the polar cosolvent as $S_L$, then we require that $$Sp \geqq S_L 1.0$$

In other words, the polar cosolvent will be substantially more polar than the organic liquid to be thickened.

Normally the polar cosolvent will be a liquid at room temperature; however, this is not a requirement. It is required that the polar cosolvent be soluble or miscible with the organic liquid at the levels employed in this invention. Under normal circumstances, this miscibility requirement precludes the use of water as a polar cosolvent.

It should be noted that some of the prior art techniques disclose systems wherein organic liquids were thickened by neutralized ionomers and in certain cases, for example, see U.S. Pat. No. 3,396,136 cited above, wherein neutralization in situ with alcoholates inherently provided a very small amount of polar cosolvent in systems similar to those of the instant invention. However, it has now been discovered that polar cosolvent must be present in critical amounts of from 10 to 600 moles per mole of ionic group in order to give the desirable results of the instant invention and preferably from 20 to 400 moles per mole of ionic group. This amount is some 10 to 600 times greater than amounts employed in the cited patent.

The method of the instant invention is especially useful for preparing systems wherein the viscosity may be reversibly controlled over broad temperature ranges. Thus, the polar cosolvent is chosen to be substantially nonvolatile at the temperatures at which the compositions prepared by the instant method are utilized. In general, this means that alcohols and amines, which are the preferred class of polar cosolvents, will have a boiling point of at least 50° C. and more preferably, at least 80° C. Specific examples of polar cosolvent include:

| | |
|---|---|
| Methanol | Ethylene glycol |
| Ethanol | Diethylene glycol |
| Propanol | Glycol |
| n-butanol | 1,4-butanediol |
| sec-butanol | Dimethyl phthalate |
| Isopropanol | Formamide |
| Pentanol | N—methyl formamide |
| Hexanol | Pyrolidone |
| Benzyl alcohol | Propylene glycol |
| 2-ethyl hexanol | Butyrolactone ethylamine |
| Dimethyl phosphite | |
| Methylamine | N—ethyl acetamide |
| Dimethylamine | |

The compositions prepared by the method of the instant invention have unexpectedly different properties than the prior art systems which utilize ionomeric polymers without a cosolvent to thicken organic liquids. For example, lightly sulfonated polystyrene (less than 0.5 metal sulfonate groups per 100 repeating units) is soluble in hydrocarbon liquids and behaves as a thickener. Higher sulfonate levels lead to gelled hydrocarbon liquids. However, the viscosity of such solutions or gels decrease markedly and monotonically with increasing temperature. In other words, the simple combination of a two-phase polymer such as polystyrene with a low level of sulfonate groups (from 0.1 to 5.0 mole percent) appended, results in a true solution or a gel or a combination of these two states. The viscosity behavior of such liquids with change in temperature is unremarkable—in that one obtains an expected decrease in solution viscosity with increasing temperature. This behavior is also typical of polymers which contain no ionic groups appended, and is well-known to those skilled in the art.

In the process of the instant invention, the addition of a small amount of a polar cosolvent such as an alcohol, with the hydrocarbon liquid and the sulfonated polymer, results in a homogeneous solution, but surprisingly, one in which the solution viscosity can be controlled to an unusual degree.

This behavior with the optional cosolvent is consistent with the two polymer species being solvated somewhat independently by the respective solvents. Thus, the methacrylate backbone will be solvated by low polarity solvents with approximately the same effectiveness across a wide temperature range. However, the solvation of the sulfonate groups can be expressed as follows:

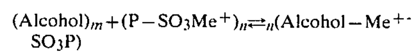

$$(\text{Alcohol})_m + (P-SO_3Me^+)_n \rightleftharpoons _n(\text{Alcohol}-Me^+ \cdot SO_3P)$$

Favored at high temperature Favored at low temperature

It is believed that at higher temperatures, the dissociation of the solvated sulfonate groups on the right side of the reaction occurs. The consequence of this is that at higher temperatures, increased interchain aggregation and a consequent increase in polymer reduced viscosity is observed.

It is clear that if this postulated equilibrium is correct, then the presence of higher levels of alcohol will essentially break up the interchain ionic aggregation. At very low levels of alcohol, there will be insufficient interaction to break up the ionic interaction to permit polymer dissolution. Similarly, if the agent (such as the alcohol postulated in the equilibrium) does not solvate the polymer strongly enough, again the polymer will not tend to dissolve adequately. Therefore, it is apparent that a relatively polar cosolvent is required.

The compositions prepared by the method of the instant invention have use as explosive compositions, fuels, pigments coatings and lacquer coatings where viscosity control is important; and in hand soaps, explosives and greases, oils and other lubricants, wherein viscosity index improvement is desirable.

The following examples are preferred embodiments of the instant invention.

EXAMPLE I

A copolymer of 2-ethyl hexyl methacrylate and sodium styrene sulfonate was prepared at a sulfonate level of about 2.0 mole percent. Similarly, copolymers of n-butyl acrylate and sodium styrene sulfonate were prepared at sulfonate levels of about 1 and 2 mole percent. The preparation of these systems has been described in an earlier patent application.

The solubility behavior of these polymers was examined in toluene, 5% methanol and these polymers were also dissolved in xylene and in a paraffinic oil (100N) at fairly high levels. The viscosity behavior of one specific sample (copolymer of 2-ethyl hexyl methacrylate/-sodium styrene sulfonate of 2 mole percent sulfonate level) was examined over a range of concentrations and over a range of temperatures, dissolved in 100N oil. The actual viscosity values are shown in Table I and contrasted with that of the base oil.

The viscosity data of these systems can also be treated differently to obtain the reduced viscosity of the polymers, thereby normalizing the data. In effect this treatment subtracts the viscosity of the solvent and provides an independent measure of the size of the polymer coil as a function of temperature and polymer concentration. The Reduced Viscosity data for these solutions are shown in Table 2 at polymer concentrations of 0.5% and higher. The data at lower concentrations were obtained but have too high experimental errors to be considered. It is clearly evident in all cases that the Reduced Viscosity increases with temperature until it reaches a maximum at 75° C. and then decreases. Clearly these data show that the polymers of this invention are behaving in a unique fashion to viscosify mineral oils.

TABLE I

VISCOSITY-TEMPERATURE BEHAVIOR OF 2-ETHYL HEXYL METHACRYLATE/SODIUM STYRENE SULFONATE COPOLYMER IN 100N OIL

| Solution Temp. | Viscosity, CS 100N | B-5 0.125% | B-4 0.25% | B-3 0.5% | B-2 1% | B-1 2% | B 4% |
|---|---|---|---|---|---|---|---|
| 0° C. | 159.5 | 167.1 | 172.5 | 186.7 | 211.1 | 271.7 | 510.5 |
| 25° C. | 38.71 | 40.15 | 41.53 | 45.43 | 52.76 | 70.80 | 131.1 |
| 50° C. | 14.19 | 14.78 | 15.44 | 16.76 | 19.63 | 26.85 | 50.20 |
| 75° C. | 6.93 | 7.17 | 7.54 | 8.26 | 9.78 | 13.41 | 24.55 |
| 100° C. | 4.29 | 4.43 | 4.57 | 4.90 | 5.82 | 7.82 | 14.56 |

TABLE 2

REDUCED VISCOSITY MEASUREMENTS OF 2-ETHYL HEXYL METHACRYLATE/SULFONATE COPOLYMERS IN 100N OIL

| Solution | (Weight Percent) Polymer Concentrations | | | |
|---|---|---|---|---|
| Temperature, °C. | .5 | 1.0 | 2.0 | 4.0 |
| 0 | .339 | .322 | .351 | .550 |
| 25 | .342 | .360 | .413 | .595 |
| 50 | .362 | .384 | .446 | .634 |
| 75 | .384 | .409 | .467 | .635 |
| 100 | .285 | .355 | .411 | .598 |

EXAMPLE 2

A copolymer of 2-ethyl hexyl methacrylate and sodium styrene sulfonate was prepared as described in a previous patent application (U.S. Ser. No. 493,143). This sample was prepared by charging 6 mole percent sodium styrene sulfonate. The polymer was observed to be soluble in mineral oil and mineral oil containing 10% by volume of hexanol (Sample 2B). A solution of sample 2A in solvent 100N containing 4 gms of polymer per 100 ml was prepared (Sample 2A). Similarly a solution (Sample 2B) was prepared containing 4 gms of polymer per 100 ml of a solvent mixture of 90% solvent 100N and 10% hexanol. Both solutions were homogeneous. Viscosity measurements were conducted at temperature of 0°, 25°, 50°, 75°, 100°, 120°, and 140° C., as shown in Table 3.

TABLE 3

VISCOSITY - TEMPERATURE BEHAVIOR OF 2-ETHYL HEXYL METHACRYLATE/SULFONATE COPOLYMER IN 100N OIL AND OIL HEXANOL MIXTURE (90/10)

Temperature, °C.
Viscosity Expressed in Centipoise as Indicated
Spindle speed in RPM

| | 0 | | 25 | | 50 | | 75 | | 100 | | 120 | | 140 | |
|---|---|---|---|---|---|---|---|---|---|---|---|---|---|---|
| Sample | RPM | Visc. | RPM | Visc. | RPM | Visc. | RPM | Visc. | RPM | Visc. | RPM | Visc. | RPM | Visc. |
| 2A | 1.5 | 294.4 | 3 | 81.4 | 12 | 27.4 | 12 | 14.8 | 30 | 8.6 | 30 | 6.1 | 30 | 4.6 |
| | 0.6 | 295 | 1.5 | 80.8 | 6 | 27.2 | 6 | 14.8 | 12 | 8.7 | 12 | 6.1 | 12 | 4.6 |
| | 0.3 | 296 | 0.6 | 81.0 | 3 | 22.4 | 3 | 15.0 | 6 | 8.7 | 6 | 6.2 | 6 | 4.6 |
| 2B | 1.5 | 196.8 | 6 | 55.8 | 12 | 21.7 | 12 | 10.8 | 30 | 6.4 | 30 | 4.7 | 30 | 3.5 |
| | 0.6 | 195 | 3 | 55.2 | 6 | 21.6 | 6 | 10.7 | 12 | 6.4 | 12 | 4.6 | 12 | 3.6 |
| | 0.3 | 196 | 1.5 | 54.8 | 3 | 22.0 | 3 | 10.8 | 6 | 6.4 | 6 | 4.7 | 6 | 3.6 |

It is evident in Table 3 that the copolymer is soluble in mineral oil and in mineral oil containing 10% by volume of an alcohol such as hexanol. The data in Table 3 can be compared with that in Table 1 wherein a comparison of the viscosity decrease of the base oil (100N) over the temperature range of 0° C. to 100° C. can be compared with samples 2A and 2B over the same range. A suitable comparison is shown in Table 4. The ratio $$\left(\frac{\text{viscosity at } 0^\circ \text{ C.}}{\text{viscosity at } 100^\circ \text{ C.}}\right)$$

can be regarded as a measure of the change of viscosity with temperature wherein a low value is indicative of less viscosity change, which is a very desirable attribute for a viscosity index improver.

TABLE 4

Comparison of Viscosity Ratios for Base and Sulfonate Copolymers

| Sample | Viscosity Ratio |
|---|---|
| Base Oil (100N) | 37.2 |
| Sample 2A (Copolymer in 100N) | 33.9 |
| Sample 2B (Copolymer in 100N + Hexanol) | 30.4 |

It is clear that the polymers described in this application display a marked improvement in the viscosity ratio over that for the base oil.

What is claimed is:

1. A method for controlling the low temperature viscosity of a lubricating oil, said lubricating oil having a solubility parameter of from about 6.0 to about 10.5 and a viscosity of from 35 to 50,000 SUS at 100° F., which comprises incorporating in said lubricating oil an ionomeric polymer, said ionomeric polymer comprising a copolymer or terpolymer derived from a metal or amine neutralized sulfonated styrene monomer and at least one alkyl acrylate and/or alkyl methacrylate monomer, wherein the alkyl group has at least eight carbon atoms wherein said ionomeric polymer is incorporated into said lubricating oil at a level of from 0.1 to 20 weight percent of said lubricating oil.

2. The method of claim 1 wherein said ionomeric polymer comprises from 0.5 to 10 mole percent pendant ionic groups.

3. The method of claim 1 wherein said ionomer groups are neutralized to a degree of from about 90 to about 200%.

4. The method of claim 1, further including a polar cosolvent mixed with said lubricating oil, said ionomeric polymer being incorporated into the mixture of said lubricating oil and said polar cosolvent, wherein said polar cosolvent has a solubility parameter of from about 10 to 20, the solubility parameter of said polar cosolvent being at least 1.0 unit higher than the solubility parameter of said lubricating oil, said polar cosolvent being soluble or miscible with said lubricating oil and said polar cosolvent being incorporated into said lubricating oil in an amount of from 10 to 600 moles per mole of pendant ionic groups.

5. The method of claim 4 wherein said polar cosolvent comprises from about 0.1 to 40 weight percent of the total mixture of lubricating oil, ionomeric polymer and polar cosolvent.

6. The method of claim 5 wherein said polar cosolvent is selected from the group consisting of alcohols and amines.

7. The method of claim 6 wherein said polar cosolvent has a boiling point of at least 50° C.

8. The method of claim 4 wherein said polar cosolvent is selected from the group consisting of hexanol, heptanol, octanol, nonylalcohol, decanol, dodecanol, tridecylalcohol and benzyl alcohol.

9. A composition of matter comprising a major amount of a lubricating oil having a solubility parameter of from 6.0 to 10.5 and a viscosity of 35 to 50,000 SUS at 100° F., and an ionomeric polymer, said ionomeric polymer comprising a copolymer or terpolymer derived from a metal or amine neutralized sulfonated styrene monomer and at least one alkyl acrylate and/or alkyl methacrylate monomer, wherein the alkyl group has at least eight carbon atoms and a polar cosolvent having a solubility parameter of from about 10 to 20, wherein said composition of matter comprises from 0.1 to 20 weight percent, based on said lubricating oil, of said ionomeric polymer.

10. The composition of claim 9, further including about 10 to 600 moles of a polar cosolvent per mole pendant ionic group, the solubility parameter of said polar solvent being at least 1.0 unit higher than the solubility parameter of said lubricating oil, said polar cosolvent being soluble or miscible with said lubricating oil.

11. The composition of claim 9 wherein said lubricating oil is a hydrocarbonaceous oil.

12. The composition of claim 10 wherein said polar cosolvent comprises from about 0.1 to 40 weight percent of the total mixture of lubricating oil, ionomeric polymer and polar cosolvent.

13. The composition of claim 10 wherein said polar cosolvent is selected from the group consisting of alcohols and amines.

14. The composition of claim 13 wherein said polar cosolvent has a boiling point of at least 50° C.

15. The composition of claim 9 wherein said ionomeric polymer comprises from about 0.5 to about 10 mole percent pendant ionic groups.

16. The composition of claim 9 wherein said ionomer groups are neutralized to a degree of from about 90 to about 200%.

17. The composition of claim 10 wherein said polar cosolvent is selected from the group consisting of hexanol, heptanol, octanol, nonylalcohol, decanol, dodecanol, tridecylalcohol and benzyl alcohol.

18. A composition according to claim 9 wherein said copolymer or terpolymer comprises at least 80 percent by weight of at least one acrylate or methacrylate monomer having from 8 to 12 carbon atoms and a minor proportion of a metal or amine neutralized sulfonate monomer characterized by the formula:

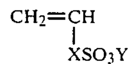

where X is $(CH_2)_n$, or aromatic wherein n=0, 1, 2, 3, 4, and Y is a cation selected from Groups IA, IIA, IB and IIB of the Periodic Table or an amine of the formula:

$$N \begin{cases} R_1 \\ R_2 \\ R_3 \end{cases}$$

where $R_1$, $R_2$, and $R_3$ can be aliphatic groups of $C_1$ to $C_{12}$ or hydrogen, said co- or terpolymer being water insoluble, and substantially gel-free, having at least 0.2 weight percent chemically combined to less than 5 weight percent chemically combined sulfur.

19. A composition according to claim 18 wherein said sulfonate-containing monomer is a metal neutralized sulfonate styrene.

20. A composition according to claims 18 or 2 wherein said acrylate monomer is selected from the group consisting of 2-ethylhexylacrylate, 2-ethylhexylacrylate, isodecylacrylate, 2-ethyl-hexylmethacrylate lauryl methacrylate, and isodecylmethacrylate.

* * * * *